(12) United States Patent
Arataki

(10) Patent No.: US 7,415,555 B2
(45) Date of Patent: Aug. 19, 2008

(54) BUS BRIDGE DEVICE

(75) Inventor: Nina Arataki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 72 days.

(21) Appl. No.: 11/185,853

(22) Filed: Jul. 21, 2005

(65) Prior Publication Data

US 2005/0256998 A1 Nov. 17, 2005

Related U.S. Application Data

(63) Continuation of application No. PCT/JP03/04074, filed on Mar. 31, 2003.

(51) Int. Cl.
G06F 13/00 (2006.01)

(52) U.S. Cl. ..................... 710/110; 710/306

(58) Field of Classification Search ............... 710/300, 710/110, 305, 306, 310, 311, 313–315, 260, 710/266–269
See application file for complete search history.

(56) References Cited

U.S. PATENT DOCUMENTS

| | | | | |
|---|---|---|---|---|
| 5,751,975 A | * | 5/1998 | Gillespie et al. | 710/315 |
| 6,098,134 A | * | 8/2000 | Michels et al. | 710/108 |
| 6,209,067 B1 | * | 3/2001 | Collins et al. | 711/158 |
| 6,715,011 B1 | * | 3/2004 | Buckland et al. | 710/100 |
| 7,051,145 B2 | * | 5/2006 | Butler et al. | 710/305 |
| 2002/0040414 A1 | * | 4/2002 | Uehara et al. | 710/100 |

FOREIGN PATENT DOCUMENTS

| | | |
|---|---|---|
| EP | 1 330 989 | 7/2003 |
| JP | 52-122443 | 10/1977 |
| JP | 7-13883 | 1/1995 |
| JP | 9-81502 | 3/1997 |
| JP | 2001-243206 | 9/2001 |
| JP | 2001-350674 | 12/2001 |
| JP | 2002-073286 | 3/2002 |
| JP | 2003-046535 | 2/2003 |

OTHER PUBLICATIONS

"PCI Local Bus Specification Rev.2.2" http://www.ece.mtu.edu/faculty/btdavis/courses/mtu_ee3173f04/papers/PCI22.pdf dated Dec. 18, 1998.
International Search Report for corresponding International Appln. No. PCT/JP03/04074.

* cited by examiner

*Primary Examiner*—Khanh Dang
(74) *Attorney, Agent, or Firm*—Staas & Halsey LLP

(57) ABSTRACT

A bus bridge device, which connects a first device executing a first process and a second device executing a second process in response to a request from the first device, includes a notifying unit that notifies, when a result of the second process is received from the second device, the result to the first device. The first device executes, after sending the request, a third process until the result is notified from the notifying unit.

10 Claims, 7 Drawing Sheets

FIG.5 (PRIOR ART)

BUS BRIDGE DEVICE

CROSS REFERENCE TO RELATED APPLICATION

This application is a Continuing Application filed under 35 U.S.C. § 111 (a), of International Application PCT/JP03/04074, filed Mar. 31, 2003, now pending, and incorporated by reference herein.

BACKGROUND OF THE INVENTION

1. Field of the Invention

The present invention relates to a bus bridge device that connects a first device executing a first process and a second device executing a second process in response to a request from the first device.

2. Description of the Related Art

Conventionally, when there is a necessity to carry out communication between a plurality of devices connected to a plurality of buses, the buses are connected by means of bus bridges to enable communication between the devices.

FIG. 5 is a drawing of a storage system that uses peripheral component interconnect (PCI) bridge modules and a packet network to connect PCI buses. As shown in FIG. 5, storage control modules $100_1$ and $100_2$ receive a processing request from hosts $10_1$ and $10_2$ and control a storage system 20. Disks $700_1$ and $700_2$ store data and cache memory modules $300_1$ through $300_4$ provide fast data access. Each of the storage control modules $100_1$ and $100_2$, the disks $700_1$ and $700_2$, and the cache memory modules $300_1$ through $300_4$ are connected to separate PCI buses $400_1$ through $400_8$. The PCI buses $400_1$ through $400_8$ are connected to a packet network 500 via PCI bridge modules $800_1$ through $800_8$.

When writing data to the storage system 20, for example, the storage control module $100_1$, upon fetching a write data request from the host $10_1$, sends the write data request to the PCI bridge module $800_1$ via the PCI bus $400_1$. The PCI bridge module $800_1$ transmits the write data request to the PCI bridge module $800_2$ via the packet network 500, and the PCI bridge module $800_2$ sends the write data request to the cache memory module $300_1$ via the PCI bus $400_2$. The cache memory module $300_1$ writes data to a cache memory.

The storage control module $100_1$ also sends the write data request to the cache memory module $300_2$ via the PCI bridge module $800_1$, the packet network 500, and the PCI bridge module $800_4$ as a precaution against a breakdown of the cache memory module $300_1$.

The data written to the cache memory by the cache memory module $300_1$ and the cache memory module $300_2$ is later sent to a disk controller $600_1$ or a disk controller $600_2$, and written to the disk $700_1$ or the disk $700_2$.

Thus, in the storage system 20, the storage control module $100_1$ needs to send the write data request to the cache memory module $300_1$ connected to the PCI bus $400_2$ and the cache memory module $300_2$ connected to the PCI bus $400_4$.

FIG. 6 is a flowchart of a sequence of writing data to the cache memory by the storage system 20 shown in FIG. 5. As shown in FIG. 6, the storage control module $100_1$, when writing data to the cache memory module $300_1$, issues a write command (step S601). The PCI bridge module $800_1$, which fetches the write command, sets a transmission notifying register 250 that indicates that data is being transmitted (step S602), and packet transmits the write command to the PCI bridge module $800_2$ by means of the packet network 500 (step S603).

The PCI bridge module $800_2$ fetches the packet and issues a write command to the cache memory module $300_1$ (step S604). The cache memory module $300_1$ writes data to the cache memory (step S605). The cache memory module $300_1$ issues a reply code, which indicates a result of writing data (step S606). The PCI bridge module $800_2$, which fetches the reply code, packet transmits the reply code to the PCI bridge module $800_1$ by means of the packet network 500. The PCI bridge module $800_1$, upon fetching the reply code, sets a reply code notifying register 260 that indicates a receipt of the reply code (step S607), and resets the transmission notifying register 250 (step S608).

The storage control module $100_1$, upon issuing the write command, issues a validate command to the PCI bridge module $800_1$ to fetch the reply code (step S609). If the PCI bridge module $800_1$ has not received the reply code, the PCI bridge module $800_1$ sends a retry message to the storage control module $100_1$ to once again request issue of the validate command (step S610). Issue of a validate command by the storage control module $100_1$ and sending of a retry message by the PCI bridge module $800_1$ is repeated.

Next, when the PCI bridge module $800_1$ fetches the reply code and the storage control module 1001 issues a validate command (step S611), the PCI bridge module $800_1$ sends the reply code to the storage control module $100_1$ (step S612).

Thus, the conventional PCI bridge module $800_1$, by returning the reply code fetched from the PCI bridge module $800_2$ in response to a validate command issued by the storage control module $100_1$, notifies the storage control module $100_1$ of the status of writing data to the cache memory module $300_1$ connected to the other PCI bus $400_2$ (see Japanese Patent Laid-Open Publication No. 2001-243206). Specifications of a PCI bus are disclosed in "PCI Local Bus Specification Rev2.2 1998/12/18" (PCI Special Interest Group).

However, in the conventional technology, the storage control module $100_1$, which is a processing request source, is unable to carry out any other process until the receipt of the reply code. In other words, the storage control module $100_1$, which is the processing request source, needs to continuously issue a validate command during the time interval when the storage control module $100_1$ is fetching the retry message. Thus, unnecessary operation is repeated until the storage control module $100_1$ fetches the reply code.

SUMMARY OF THE INVENTION

It is an object of the present invention to at least solve the problems in the conventional technology.

A bus bridge device according to an aspect of the present invention, which connects a first device executing a first process and a second device executing a second process in response to a request from the first device, includes a notifying unit that notifies, when a result of the second process is received from the second device, the result to the first device. The first device executes, after sending the request, a third process until the result is notified from the notifying unit.

A bus bridge device according to another aspect of the present invention, which connects a first device executing a first process and a second device executing a second process in response to a request from the first device, includes: a first notifying unit that notifies, when receiving an inquiry about the second process from the first device before receiving a result of the second process from the second device, the first device that the second process is being executed; a second notifying unit that notifies, when receiving the result from the second device, the result to the first device by writing the result in a predetermined memory area of the first device; a third notifying unit that notifies, when receiving the result from the second device, the result to the first device by generating an interrupt with respect to the first device; and a selecting unit that selects, based on a specification by the first device, any one of the first notifying unit, the second notifying unit, and the third notifying unit.

A method according to still another aspect of the present invention, which is for controlling a bus bridge device that connects a first device executing a first process and a second device executing a second process in response to a request from the first device, includes notifying, when a result of the second process is received from the second device, the result to the first device. The first device executes, after sending the request, a third process until the result is notified from the notifying unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a drawing of a storage system that uses PCI bridge modules and a packet network to connect PCI buses.

DETAILED DESCRIPTION OF THE PREFERRED EMBODIMENTS

Figure 5:
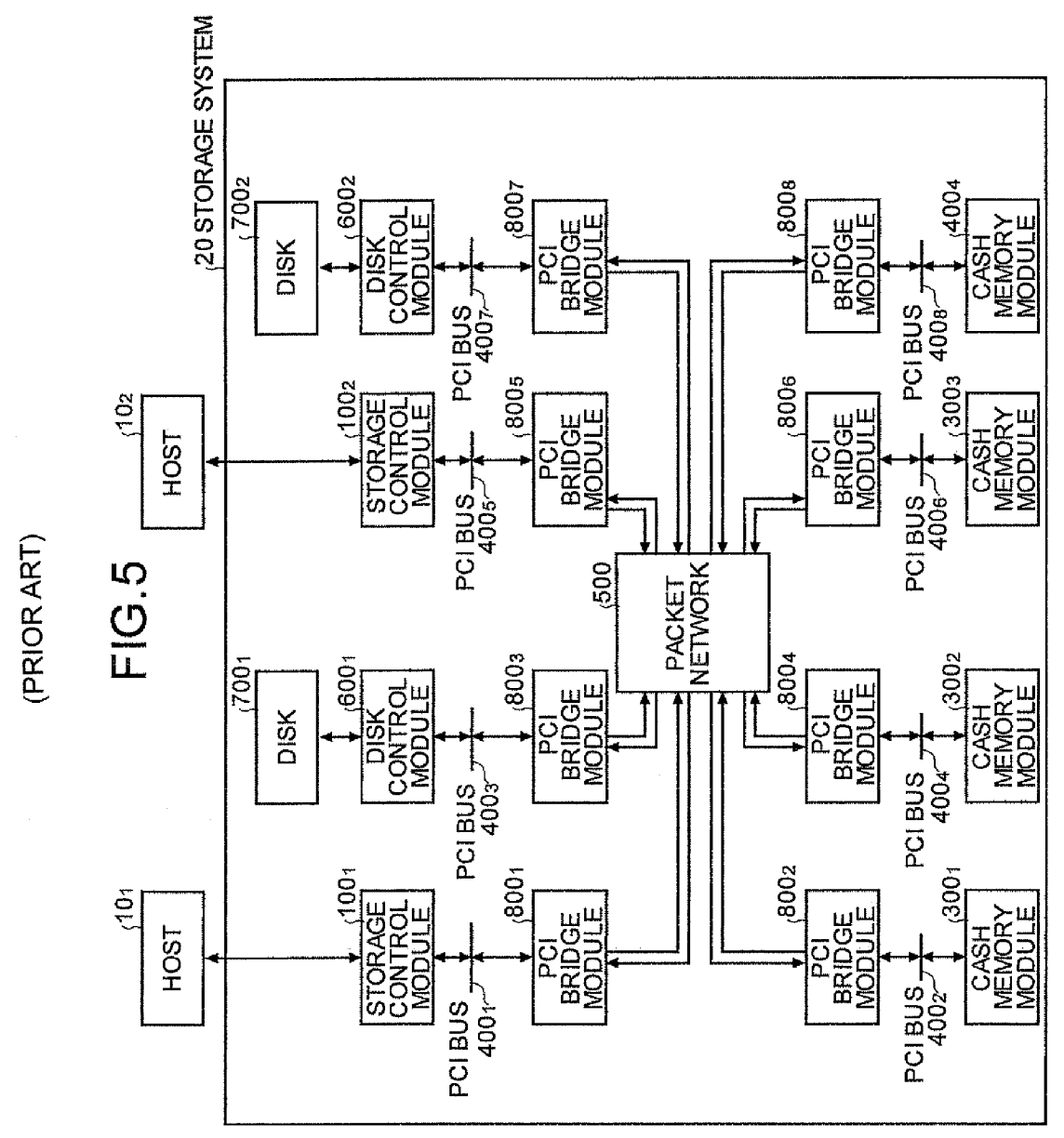

Exemplary embodiments of the present invention are explained next with reference to the accompanying drawings. Application of the present invention to a peripheral component interconnect (PCI) bridge module is explained in an embodiment. A storage system, which uses PCI bridge modules $200_1$ through $200_8$ according to the embodiment instead of conventional PCI bridge modules $800_1$ through $800_8$ shown in FIG. 5, is explained in the present embodiment.

A concept of four response modes included in the PCI bridge module $200_1$ according to the present embodiment is explained first. FIG. 1A through FIG. 1D are drawings illustrating the concept of four response modes included in the PCI bridge module $200_1$ according to the present embodiment.

The PCI bridge module $200_1$ according to the present embodiment includes four response modes to notify a process result in response to a write command issued by a storage control module $100_1$. To be specific, the PCI bridge module $200_1$ includes a retry mode, a busy mode, a reply writing mode, and an interrupt mode. The retry mode is shown in FIG. 1A, the busy mode is shown in FIG. 1B, the reply writing mode is shown in FIG. 1C, and the interrupt mode is shown in FIG. 1D.

Figure 1A:
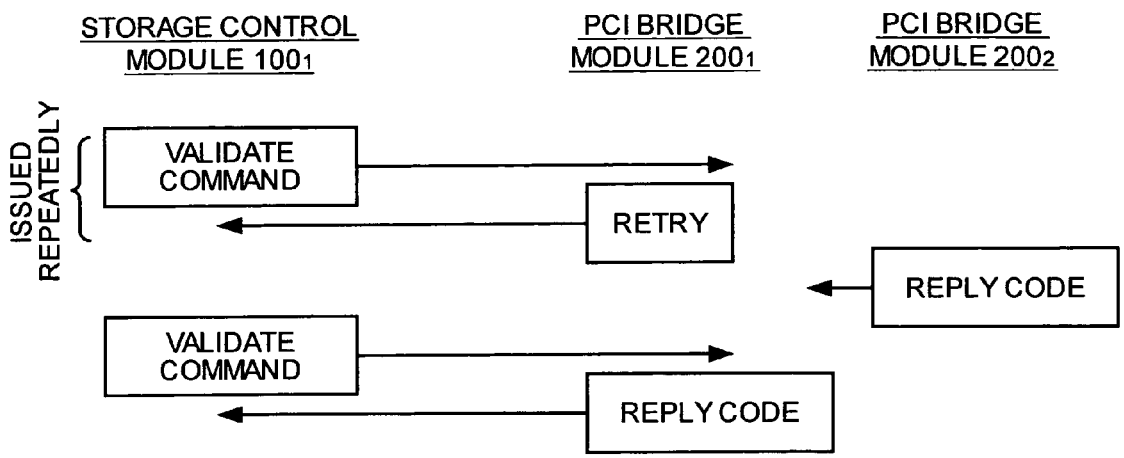
FIG. 1A through FIG. 1D are drawings illustrating a concept of four response modes included in a peripheral component interconnect (PCI) bridge module according to an embodiment of the present invention.

As shown in FIG. 1A, in the retry mode, if the PCI bridge module $200_1$ has not fetched a process result for a write command from the PCI bridge module $200_2$ connected to a cache memory module $300_1$, the PCI bridge module $200_1$ returns a retry message in response to a validate command issued by the storage control module $100_1$.

The storage control module $100_1$, upon fetching the retry message, once again issues a validate command. The storage control module $100_1$ repeatedly issues a validate command during the time interval when the storage control module $100_1$ is fetching a retry message. The PCI bridge module $200_1$, upon fetching a reply code, which is the process result for the write command, from the PCI bridge module $200_2$ connected to the cache memory module $300_1$, returns the reply code in response to a validate command issued repeatedly.

Figure 1B:
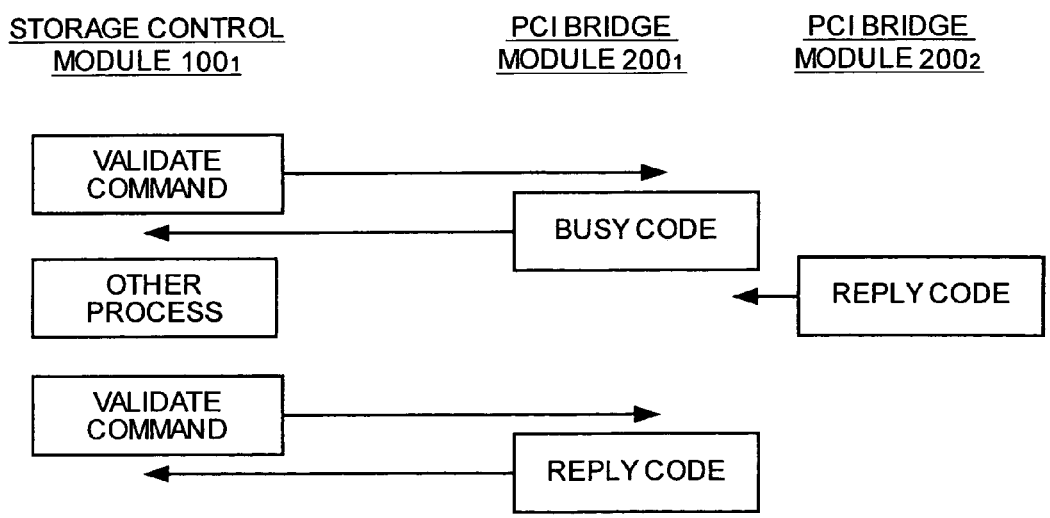
Figure 1C:
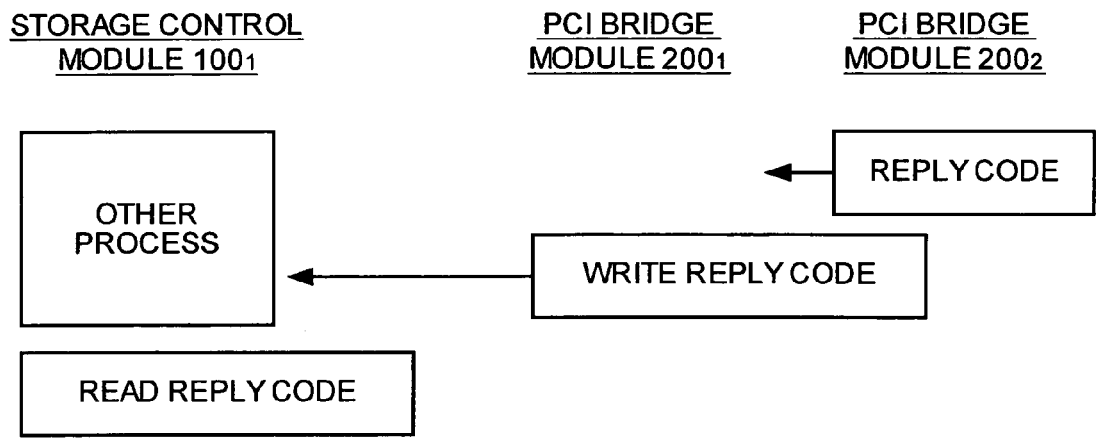
Figure 1D:
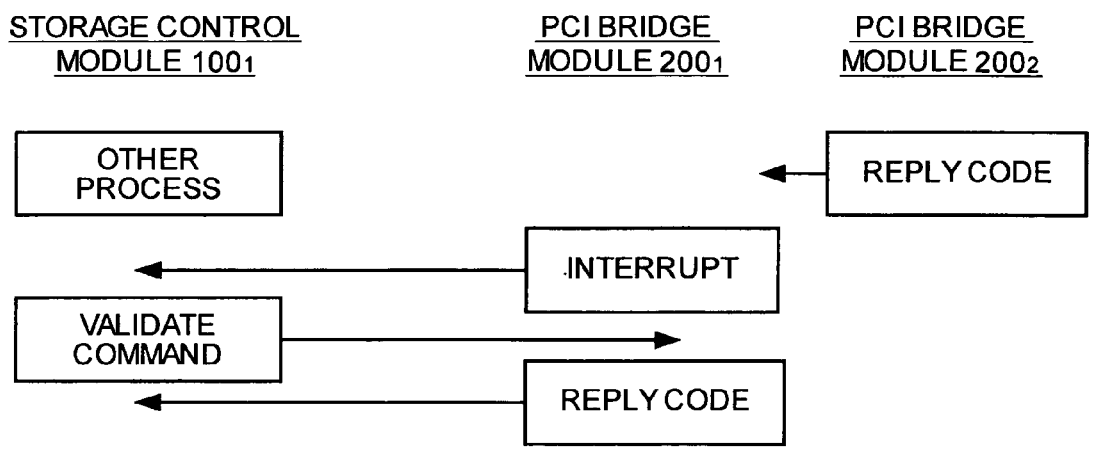

As shown in FIG. 1B, in the busy mode, if the PCI bridge module $200_1$ has not fetched the process result of the write command from the PCI bridge module $200_2$, the PCI bridge module $200_1$ returns a busy code in response to a validate command issued by the storage control module $100_1$. The storage control module $100_1$, upon fetching the busy code, executes other processes if any, and reissues a validate command. The PCI bridge module $200_1$, upon fetching the reply code from the PCI bridge module $200_2$ connected to the cache memory module $300_1$, returns the reply code in response to a validate command.

The storage control module $100_1$ does not need to continuously issue a validate command when the busy mode is used. Thus, the storage control module $100_1$ can execute other processes according to priority.

As shown in FIG. 1C, in the reply writing mode, the storage control module $100_1$ does not need to issue a validate command. The PCI bridge module $200_1$, upon fetching the reply code from the PCI bridge module $200_2$ connected to the cache memory module $300_1$, writes the reply code in a predetermined area of the storage control module $100_1$.

The storage control module $100_1$ does not need to issue a validate command when the reply writing mode is used. Thus, the storage control module $100_1$ can execute other processes during the time interval till the reply code is written.

As shown in FIG. 1D, in the interrupt mode, the PCI bridge module $200_1$, upon fetching the reply code from the PCI bridge module $200_2$ connected to the cache memory module $300_1$, generates an interrupt for the storage control module $100_1$. The storage control module $100_1$ issues a validate command and fetches the reply code.

The storage control module $100_1$ does not need to issue a validate command when the interrupt mode is used. Thus, the storage control module $100_1$ can execute other processes during the time interval till an interrupt is generated.

In the present embodiment, the PCI bridge module $200_1$ provides four response modes for the write command, and the storage control module $100_1$ appropriately uses the four response modes. Thus, the storage control module $100_1$ can efficiently fetch a process result for the write command.

Figure 2:
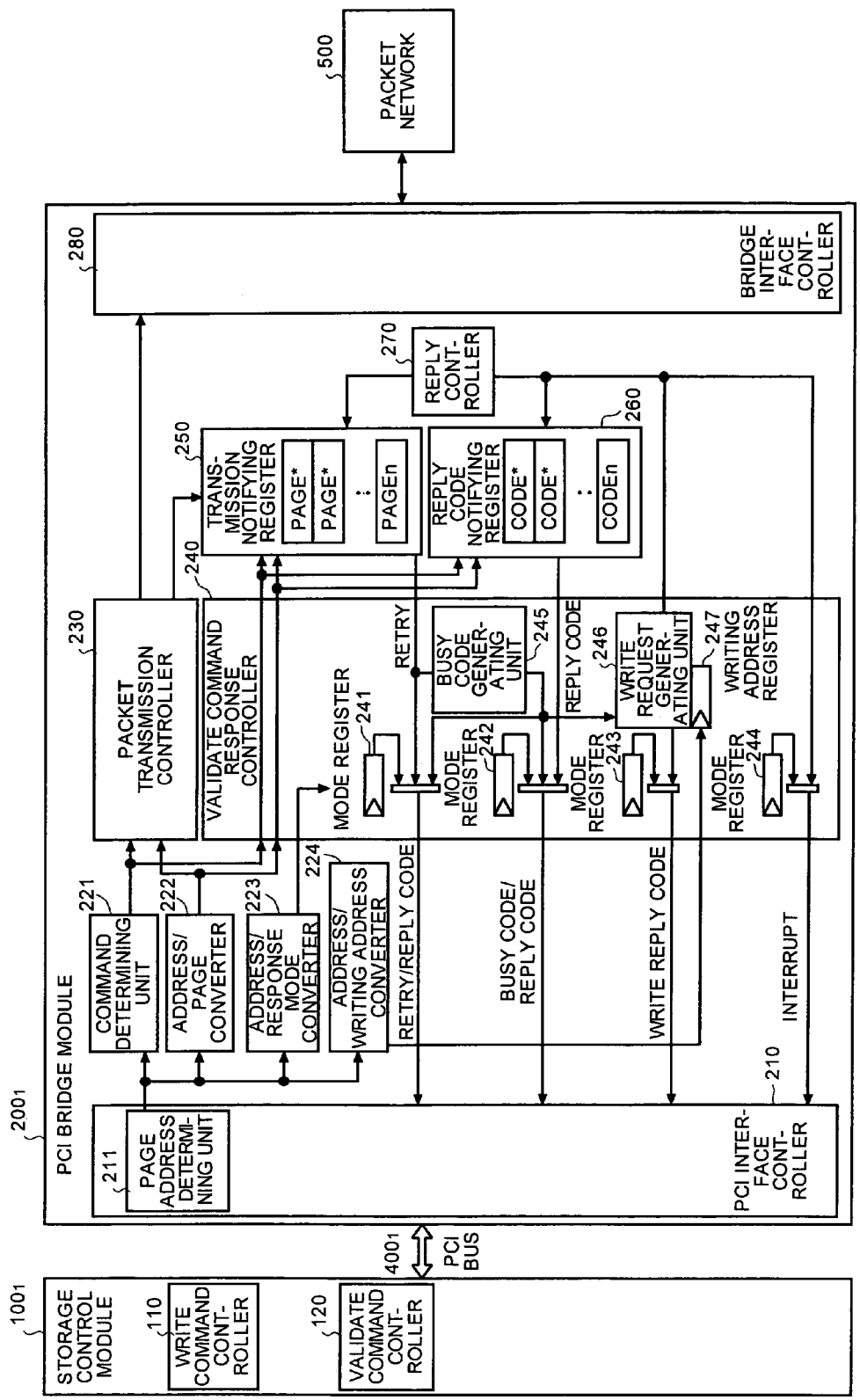
FIG. 2 is a block diagram of the PCI bridge module.

A structure of the PCI bridge module $200_1$ according to the present embodiment is explained next. FIG. 2 is a block diagram of the PCI bridge module $200_1$ according to the present embodiment. As shown in FIG. 2, the PCI bridge module $200_1$ includes a PCI interface controller 210, a command determining unit 221, an address/page converter 222, an address/response mode converter 223, an address/writing address converter 224, a packet transmission controller 230, a validate command response controller 240, a transmission notifying register 250, a reply code notifying register 260, a reply controller 270, and a bridge interface controller 280.

The PCI interface controller 210 acts as an interface between the PCI bridge module 200, and a PCI bus 4001, and includes a base address determining unit 211. The PCI interface controller 210 fetches a write command issued by a write command controller 110 and a validate command as well as a response-mode setting command issued by a validate command controller 120 of the storage control module $100_1$ via the PCI bus $400_1$. The base address determining unit 211 determines whether the address to which the aforementioned commands are issued is the address of the PCI bridge module $200_1$ or the address of any other device connected to the PCI bus $400_1$, and passes the commands with the address of the PCI bridge module $200_1$ to other devices.

Figure 3:
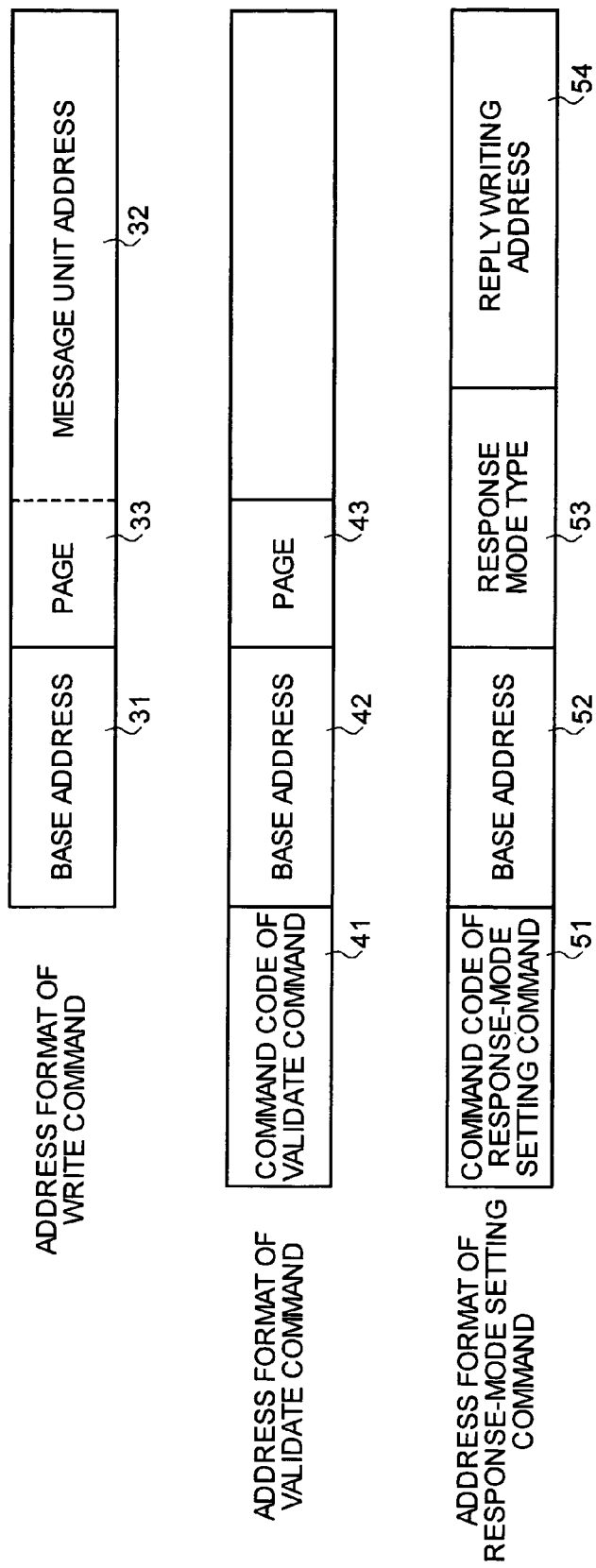
FIG. 3 is a drawing of an example of address formats of commands issued by a storage control module according to the embodiment.

FIG. 3 is a drawing of an example of address formats of commands issued by the storage control module $100_1$. As shown in FIG. 3, a write command is issued by the write command controller 110 of the storage control module $100_1$ to write data to the cache memory. A validate command is issued by the validate command controller 120 of the storage control module $100_1$ to fetch the process result for a write command. A response-mode setting command is issued by the validate command controller 120 to specify a mode to fetch the process result of a write command.

As shown in FIG. 3, an address of a write command includes a base address 31 and a message unit address 32. The base address 31 specifies a device connected to the PCI bus $400_1$. In the example shown in FIG. 3, the base address 31 specifies the PCI bridge module $200_1$. The base address determining unit 211 of the PCI interface controller 210, based on the base address 31, determines whether the write command is issued to the PCI bridge module $200_1$.

The message unit address 32 specifies the address of an area in the cache memory module $300_1$ to which data is to be written. The upper part of the message unit address 32 is used as a page 33, which differentiates each of the multiple write commands that are issued.

An address of a validate command includes a command code of validate command 41, a base address 42, and a page 43. The command code of validate command 41 specifies that a command is a validate command. The base address 42, similarly as the base address 31, specifies the PCI bridge module $200_1$. Because a validate command is issued in response to every write command, the page 43 corresponds to the page 33 of the write command, and specifies the validate command corresponding to the write command.

An address of a response-mode setting command includes a command code of response-mode setting command 51, a base address 52, a response mode type 53, and a reply writing address 54. The command code of response-mode setting command 51 specifies that a command is a response-mode setting command. The base address 52, similarly as the base address 31, specifies the PCI bridge module $200_1$. The response mode type 53 specifies the response mode that is set. The reply writing address 54 specifies an area to write the reply code when the response mode is the reply writing mode.

The command determining unit 221 shown in FIG. 2 fetches a command from the PCI interface controller 210 and determines the type of the fetched command. If the fetched command is a write command, the command determining unit 221 passes the command to the packet transmission controller 230.

If the command is a write command or a validate command, the address/page converter 222 fetches the address part of the command from the PCI interface controller 210, extracts the page 33 or the page 43 from the fetched address part, and passes the page 33 or the page 43 to the packet transmission controller 230 and the validate command response controller 240.

If the command is a response-mode setting command, the address/response mode converter 223 fetches the address part of the response-mode setting command from the PCI interface controller 210, extracts the response mode type 53 from the fetched address part, and passes the response mode type 53 to the validate command response controller 240.

If the command is a response-mode setting command and the reply writing mode is specified as the response mode type 53, the address/writing address converter 224 fetches the address part of the response-mode setting command from the PCI interface controller 210, extracts the reply writing address 54 from the fetched address part, and passes the reply writing address 54 to the validate command response controller 240.

The packet transmission controller 230 passes the command fetched from the command determining unit 221 to the bridge interface controller 280 in the form of a packet. If a write command is processed, the packet transmission controller 230 sets the transmission notifying register 250.

The validate command response controller 240 carries out a process for a validate command and a response-mode setting command issued by the storage control module $100_1$. The validate command response controller 240 includes mode registers 241 through 244, a busy code generating unit 245, a write request generating unit 246, and a writing address register 247.

The mode registers 241 through 244 are set according to the response mode type 53 fetched from the address/response mode converter 223. The mode register 241 is set when the response mode type 53 is the retry mode. The mode register 242 is set when the response mode type 53 is the busy mode. The mode register 243 is set when the response mode type 53 is the reply writing mode. The mode register 244 is set when the response mode type 53 is the interrupt mode.

When the response mode type 53 is the busy mode, and the reply code in response to a write command specified by the page 43 of a validate command is yet to arrive, the busy code generating unit 245 generates a busy code and passes the busy code to the PCI interface controller 210.

When the response mode type 53 is the reply writing mode, and the PCI bridge module $200_1$ has fetched the reply code for a write command, the write request generating unit 246 generates a code to write the reply code to the predetermined address in the storage control module $100_1$, and passes the generated code to the PCI interface controller 210.

The writing address register 247 stores the address to which the write request generating unit 246 writes the reply code in the storage control module $100_1$. The writing address register 247 stores the reply writing address 54 extracted from a response-mode setting command by the address/writing address converter 224.

The validate command response controller 240 carries out a process by using the mode registers 241 through 244 according to the response mode, thereby enabling the storage control module $100_1$ to efficiently fetch the process result for a write command from the PCI bridge module $200_1$.

The transmission notifying register 250 stores a write commands when the reply code is yet to arrive. Each of the write commands is identified by means of the page 33.

The reply code notifying register 260 stores the reply code fetched in response to a write command. A correspondence is established between each reply code and each write command by means of the page 33.

The reply controller 270 fetches the packet including the reply code from the bridge interface controller 280, deletes the corresponding page 33 of the transmission notifying register 250, and carries out a process according to the response mode. In other words, when the response mode is the retry mode or the busy mode, the reply controller 270 stores the fetched reply code in the reply code notifying register 260. When the response mode is the reply writing mode, the reply controller 270 passes the reply code to the write request generating unit 246. When the response mode is the interrupt mode, the reply controller 270 generates an interrupt for the storage module 100$_1$ via the PCI interface controller 210.

The bridge interface controller 280 acts as an interface between the PCI bridge module 200, and the packet network 500. The bridge interface controller 280 passes the packet created by the packet transmission controller 230 to the packet network 500 and passes the packet fetched from the packet network 500 to the reply controller 270.

Figure 4:
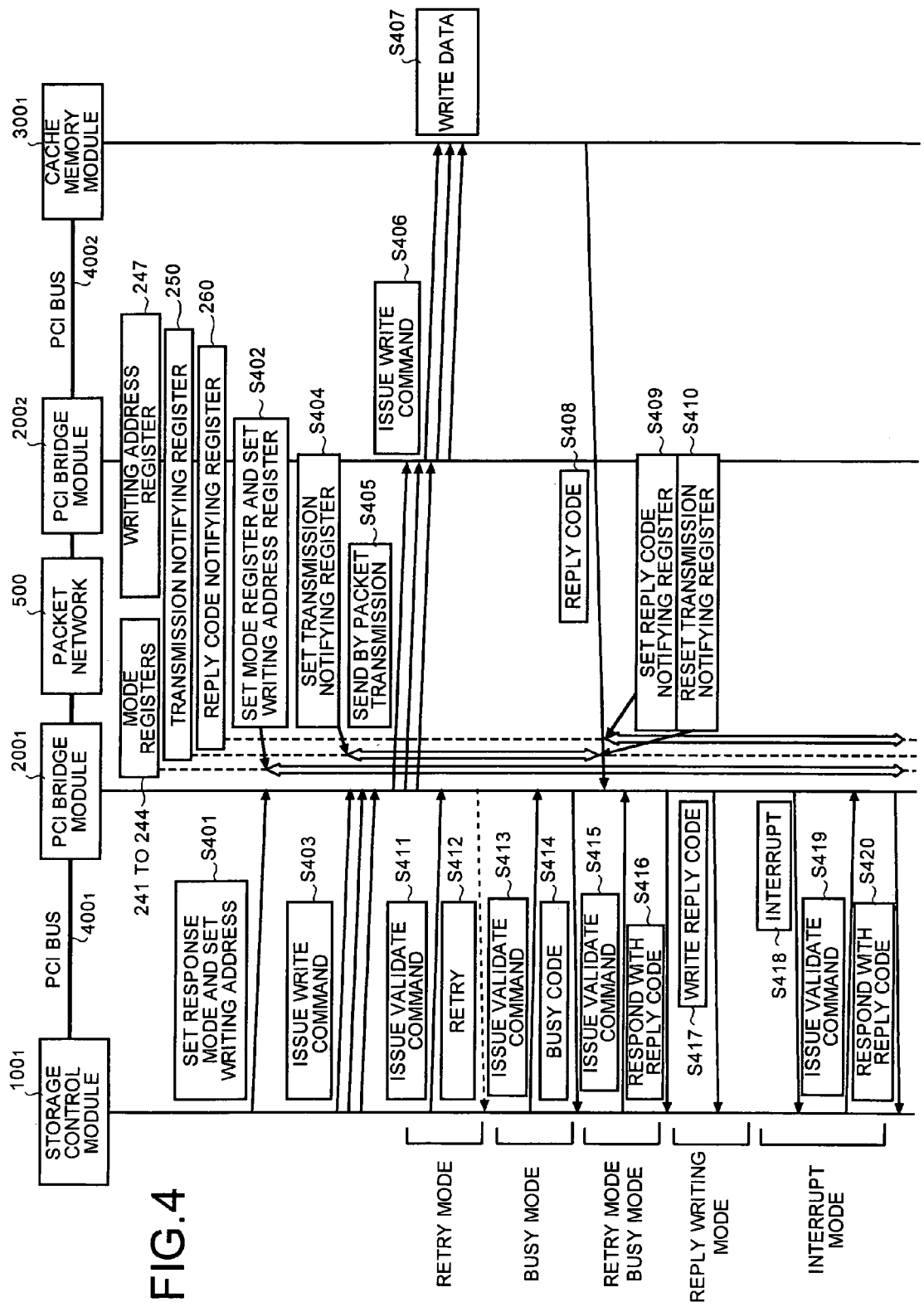
FIG. 4 is a flowchart of a sequence of writing data to a cache memory by a storage system according to the embodiment.
Figure 6:
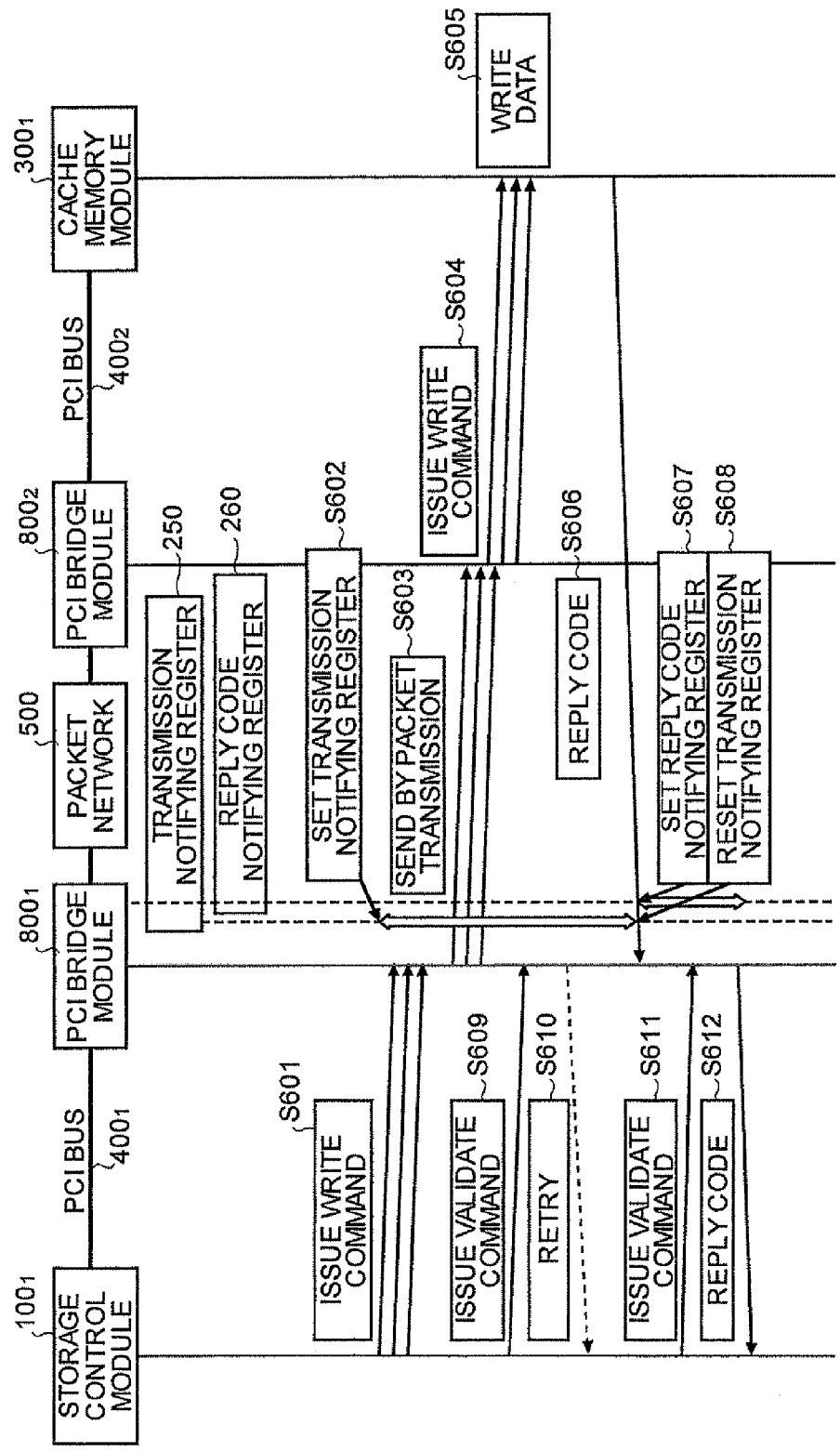
FIG. 6 is a flowchart of a sequence of writing data to the cache memory by the storage system shown in FIG. 5.

A sequence of writing data to the cache memory by the storage system 20 according to the present embodiment is explained next. FIG. 4 is a flowchart of the sequence of writing data to the cache memory by the storage system 20 according to the present embodiment.

As shown in FIG. 4, the storage control module 100$_1$, prior to writing data to the cache memory module 300$_1$, specifies the response mode by means of a response-mode setting command. If reply writing mode is specified as the response mode, the storage control module 100$_1$ also specifies the address to which the reply code is to be written (step S401).

The PCI bridge module 200$_1$, upon fetching the response-mode setting command, sets from the mode registers 241 through 244, the mode register corresponding to the specified response mode. If the specified response mode is the reply writing mode, The PCI bridge module 200$_1$ sets in the writing address register 247, the address to which the reply code is to be written (step S402).

Next, the storage control module 1001 issues a write command to write data to the cache memory module 300, (step S403), the PCI bridge module 200, sets the transmission notifying register 250 indicating transmission of data (step S404), and the cache memory module 300$_1$, by means of the packet network 500, packet transmits the write command to the PCI bridge module 200$_2$ connected to the PCI bus 400$_2$ (step S405).

The PCI bridge module 200$_2$ fetches the packet and issues a write command to the cache memory module 300$_1$ (step S406). The cache memory module 300$_1$ writes data to the cache memory (step S407). The cache memory module 300$_1$ issues a reply code that indicates the result of the write process (step S408). The PCI bridge module 200$_2$, upon fetching the reply code, packet transmits the reply code to the PCI bridge module 200$_1$ by means of the packet network 500.

The PCI bridge module 200$_1$, upon fetching the reply code, sets the reply code in the reply code notifying register 260 if the response mode is the retry mode or the busy mode (step S409). The PCI bridge module 200$_1$ resets the transmission notifying register 250 (step S410).

If the response mode is the retry mode, the storage control module 100$_1$ issues a validate command to fetch the reply code (step S411). Next, if the PCI bridge module 200$_1$ still has not received the reply code, the PCI bridge module 200$_1$ sends a retry message to the storage control module 100$_1$ to once again request issue of a validate command (step S412). The storage control module 100$_1$ repeatedly issues a validate command and the PCI bridge module 200$_1$ repeatedly issues a retry message in response.

Next, when the PCI bridge module 200$_1$ fetches the reply code and the storage control module 100$_1$ issues a validate command (step S415), the PCI bridge module 200$_1$ sends the reply code to the storage control module 100$_1$ (step S416).

If the response mode is the reply writing mode, the PCI bridge module 200$_1$, upon fetching the reply code from the PCI bridge module 200$_2$, writes the fetched reply code in the storage control module 100$_1$ (step S417).

If the response mode is the interrupt mode, the PCI bridge module 200$_1$, upon fetching the reply code from the PCI bridge module 200$_2$, generates an interrupt for the storage control module 100$_1$ (step S418). When the storage control module 100$_1$ issues a validate command (step S419), the PCI bridge module 200$_1$ returns the reply code in response (step S420).

In the present embodiment, the validate command response controller 240 sets the response mode in the mode registers 241 through 244, and based on the set response mode, notifies the process result for a write command to the storage control module 100$_1$. Thus, the storage control module 100$_1$ can efficiently fetch the process result for the write command.

The PCI buses 400$_1$ through 400$_8$ connected to each other by means of the PCI bridge modules 200$_1$ through 200$_8$ and the packet network 500 are explained in the present embodiment. However, the present invention can also be similarly applied to connect PCI buses using only PCI bridge modules.

According to the present invention, when there is an enquiry of a process result from a processing request source that makes a processing request, a response is sent to the processing request source indicating that the requested process is still being executed if a process notification for the processing request is yet to be received from a processing request destination. Thus, the processing request source can efficiently fetch the process result for the requested process.

According to the present invention, when the process notification for the processing request is received from the processing request destination, the content of the process notification is passed to the processing request source. Thus, the processing request source can efficiently fetch the process result for the requested process.

According to the present invention, when the process notification for the processing request is received from the processing request destination, an interrupt is generated for the processing request source. Thus, the processing request source can efficiently fetch the process result for the requested process.

According to the present invention, based on the specifications from the processing request source, when there is an enquiry of the process result from the processing request source that makes the processing request, a response is sent to the processing request source indicating that the requested process is still being executed if the process notification for the processing request is yet to be received from the processing request destination, and when the process notification for the processing request is received from the processing request destination, either the content of the process notification is passed to the processing request source, or an interrupt is generated for the processing request source. Thus, the processing request source can efficiently fetch the process result for the requested process.

According to the present invention, the processing request source can efficiently fetch the process result for the requested process via bus bridge devices of PCI buses. Thus, an input/output process can be carried out efficiently.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A bus bridge device, connecting a first bus end a second bus, that transmits a processing request sent by a first device connected to the first bus to a second device connected to the second bus, the bus bridge device comprising a notifying unit that has a busy mode in which the notifying unit notifies, when the first device asks the results of the processing request and the result is not received from the second device, a busy message to the first device, releasing the first device to execute other processes, instead of a retry message notified in a retry mode asking the first device to retry.

2. The bus bridge device according to claim 1, wherein the notifying unit has a reply mode in which the notifying unit notifies the result of the processing request to the first device without being requested by the first device, when the result of the processing request is received from the second device.

3. The bus bridge device according to claim 2, wherein the notifying unit notifies the result to the first device by writing the result in a predetermined memory area of the first device.

4. The bus bridge device according to claim 1, wherein
the notifying unit has a interrupt mode in which the notifying unit notifies the result of the processing request to the first device by generating an interrupt to the first device without being requested by the first device, when the result of the processing request is received from the second device.

5. The bus bridge device according to claim 1, wherein the first bus and the second bus are peripheral-component-interconnect bus.

6. The bus bridge device according to claim 5, wherein the first device is a storage controller that controls a storage system,
the second device is a cache controller that provides a fast access to the storage system, and
the request is a write-data request from the storage controller to the cache controller.

7. A method for controlling a bus bridge device, connecting a first bus and a second bus, that transmits a processing request sent by a first device connected to the first bus to a second device connected to the second bus, the method comprising notifying, when the first device asks the results of the processing request and the result is not received from the second device, a busy message in a busy mode to the first device, releasing the first device to execute other processes, instead of a retry message notified in a retry mode asking the first device to retry.

8. The method according to claim 7, wherein the notifying includes notifying the result of the processing request in a reply mode to the first device without being requested by the first device, when the result of the processing request is received from the second device.

9. The method according to claim 8, wherein the notifying includes notifying the result to the first device by writing the result in a predetermined memory area of the first device.

10. The method according to claim 7, wherein the notifying includes notifying the result of the processing request in a interrupt mode to the first device by generating an interrupt to the first device without being requested by the first device, when the result of the processing request is received from the second device.

* * * * *

UNITED STATES PATENT AND TRADEMARK OFFICE
CERTIFICATE OF CORRECTION

PATENT NO.        : 7,415,555 B2                                              Page 1 of 1
APPLICATION NO.   : 11/185853
DATED             : August 19, 2008
INVENTOR(S)       : Nina Arataki It is certified that error appears in the above-identified patent and that said Letters Patent is hereby corrected as shown below:

Column 9, line 2, change "end" to --and--.

Signed and Sealed this

Eleventh Day of November, 2008

JON W. DUDAS
*Director of the United States Patent and Trademark Office*